Oct. 24, 1950     H. A. DOHERTY     2,527,405
APPARATUS FOR RECORDING AND FOR INDICATING MACHINE
STOPPAGE DUE TO FUNCTION FAILURES

Filed May 22, 1947     7 Sheets-Sheet 1

Inventor
Henry A. Doherty

By Adams & Bush
Attorneys

Oct. 24, 1950          H. A. DOHERTY          2,527,405
APPARATUS FOR RECORDING AND FOR INDICATING MACHINE
STOPPAGE DUE TO FUNCTION FAILURES
Filed May 22, 1947          7 Sheets-Sheet 2

Inventor
Henry A. Doherty
By Adams & Bush
Attorneys

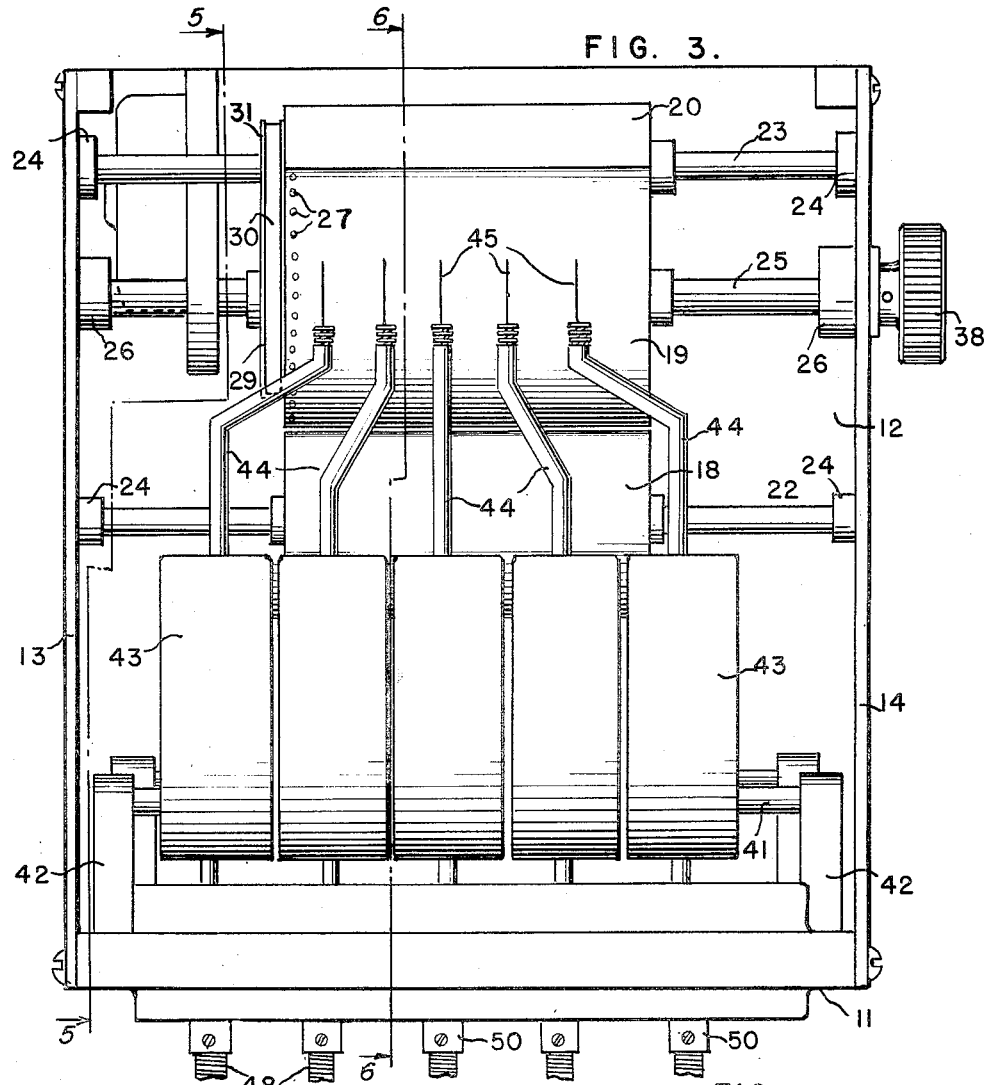
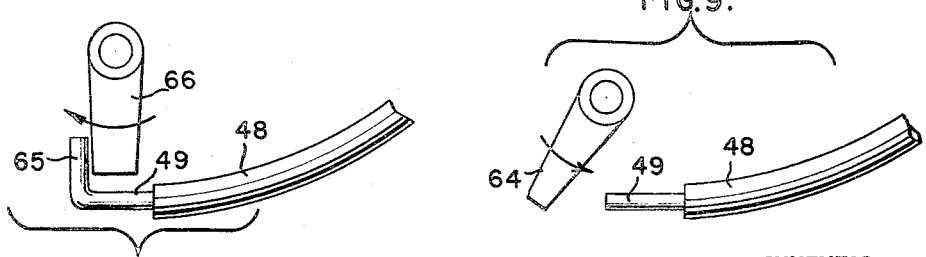

Oct. 24, 1950            H. A. DOHERTY            2,527,405
APPARATUS FOR RECORDING AND FOR INDICATING MACHINE
STOPPAGE DUE TO FUNCTION FAILURES
Filed May 22, 1947            7 Sheets-Sheet 4

Inventor
Henry A. Doherty

By Adams & Bush
Attorneys

Oct. 24, 1950 H. A. DOHERTY 2,527,405
APPARATUS FOR RECORDING AND FOR INDICATING MACHINE
STOPPAGE DUE TO FUNCTION FAILURES
Filed May 22, 1947 7 Sheets-Sheet 5

Inventor
Henry A. Doherty

By Adams & Bush
Attorneys

Oct. 24, 1950 H. A. DOHERTY 2,527,405
APPARATUS FOR RECORDING AND FOR INDICATING MACHINE
STOPPAGE DUE TO FUNCTION FAILURES
Filed May 22, 1947 7 Sheets-Sheet 6

INVENTOR.
Henry A. Doherty
BY
Adams & Bush
ATTORNEY'S

Oct. 24, 1950     H. A. DOHERTY     2,527,405
APPARATUS FOR RECORDING AND FOR INDICATING MACHINE
STOPPAGE DUE TO FUNCTION FAILURES
Filed May 22, 1947     7 Sheets-Sheet 7

INVENTOR.
Henry A. Doherty
BY
Adams + Bush
ATTORNEY'S

Patented Oct. 24, 1950

2,527,405

UNITED STATES PATENT OFFICE 2,527,405

APPARATUS FOR RECORDING AND FOR INDICATING MACHINE STOPPAGE DUE TO FUNCTION FAILURES

Henry A. Doherty, Worcester, Mass., assignor to Machine Design Associates, Inc., Worcester, Mass., a corporation of Massachusetts Application May 22, 1947, Serial No. 749,801

5 Claims. (Cl. 346—49)

This invention relates to recording devices and has more particular reference to recording devices operable to record the down or idle time of a machine or group of machines.

One object of the present invention is to provide a recording device which includes a moving record strip, a plurality of movable members carrying styli adapted to engage the strip and having actuating elements responsive to machine stoppage, all constructed and arranged to show the down or idle time of any of a group of machines or that of a single machine caused by any particular function failure.

Another object of the present invention is to provide a recording device, as above characterized, which includes visual indicators operated by the movable members to show which particular member has been actuated.

Another object of the present invention is to provide a recording device, as characterized above, which includes a group of visual indicators carried by the device and a second group of visual indicators located in a position remote from the device, both of which groups are operated by the movable members to show which particular member has been actuated.

Another object of the present invention is to provide a recording device, as above characterized, which includes locking mechanism operable in response to a stoppage of the machine and coacting with the movable members to lock any actuated one in its actuated position.

A further object of the present invention is to provide a recording device, as characterized above, which is sturdy in construction, inexpensive to manufacture, efficient and reliable in operation, and which is adapted to be used with all types of machines.

Other objects and advantages of the invention will be apparent from the specification when considered in connection with the accompanying drawings, wherein:

Fig. 3 is a front elevational view of the recorder shown in Fig. 1, with the front cover removed;

Fig. 9 is a diagrammatic view illustrating the manner in which a "push type" actuating member is operated by the machine on which the recording device is mounted;

Fig. 10 is a diagrammatic view illustrating the manner in which a "pull type" actuating member is operated by the machine on which the recording device is mounted;

Figure 1:
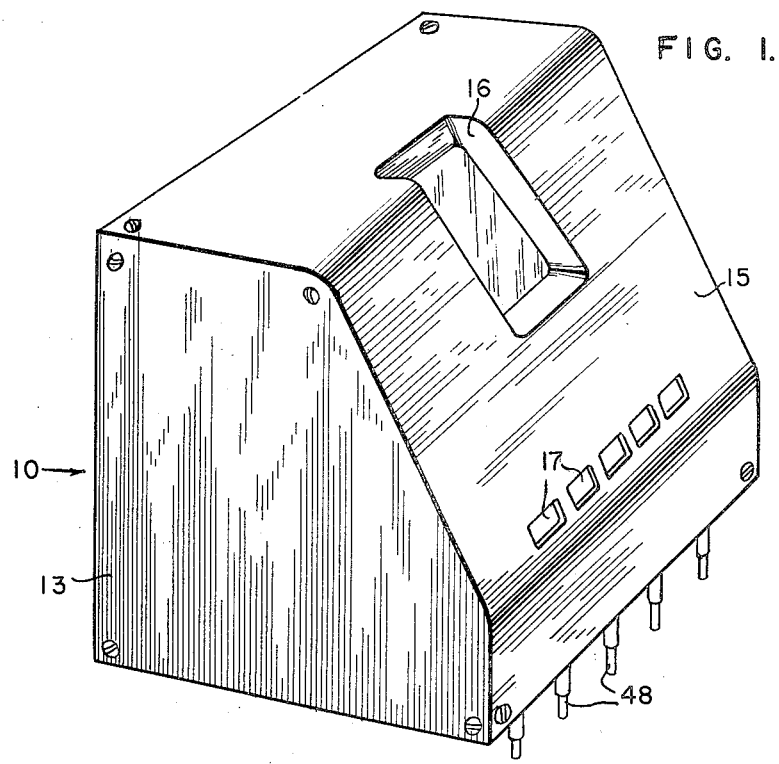
Fig. 1 is a perspective view of a recording device constructed in accordance with the invention.
Figure 4:
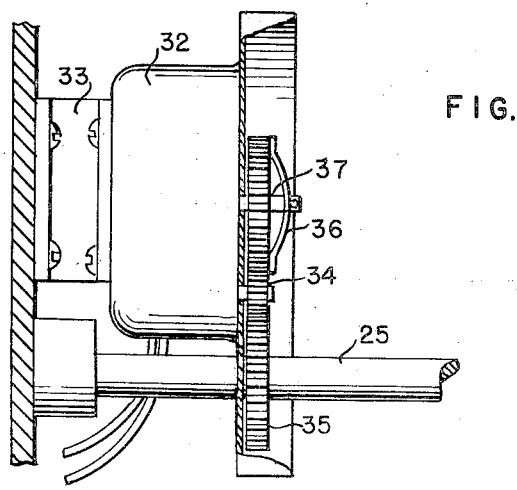
Fig. 4 is a fragmentary front elevational view with a part broken away, showing the details and mounting of the clock mechanism.
Figure 2:
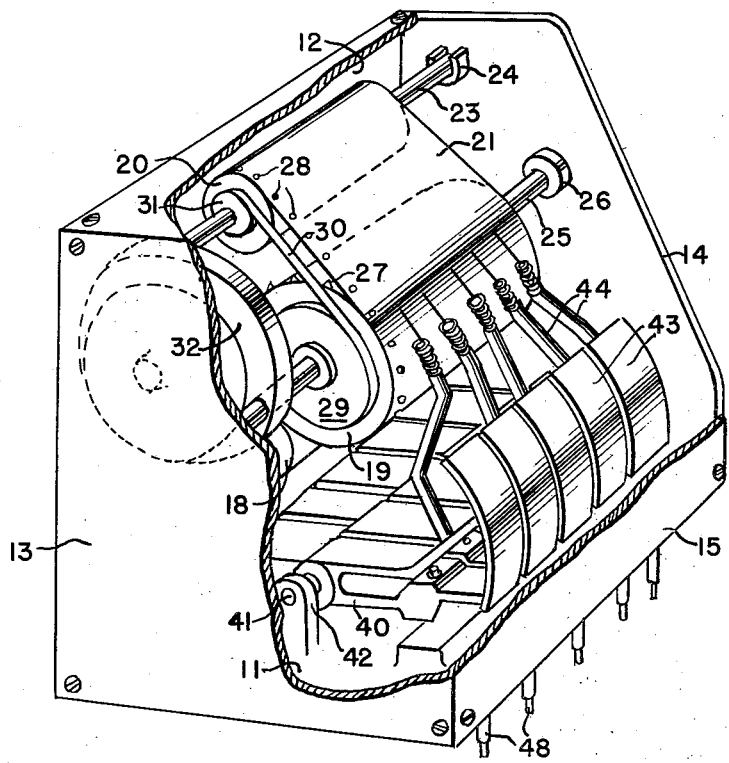
Fig. 2 is a perspective view of the recorder shown in Fig. 1, with part of the casing broken away to show the internal mechanism.

Referring now to the drawings, there is shown, in Figs. 1 to 12 inclusive, one form of a recording device, constructed in accordance with the invention and employing mechanical means for operating the stylus carrying levers. The device comprises mechanism for advancing a record chart, in the form of a rolled strip, over a plurality of rollers at a predetermined rate of speed and mechanism for recording on the record chart, by means of styli, the time of and duration of stoppage of a machine due to particular function failures thereof and simultaneously visually indicating which particular function failure caused the machine to stop.

The mechanisms are mounted in a housing or casing 10 comprising a base or bottom member 11; a rear wall 12; side walls 13 and 14; and a cover member 15 which forms the front and top walls of the housing. The cover member 15 is provided with a large, substantially rectangular, opening 16, located centrally therein and a plurality of small horizontally aligned openings 17, located adjacent to the bottom thereof, all for a purpose to be hereinafter described. The openings 16 and 17 are preferably closed by a transparent covering, such as glass.

In the particular embodiment shown, the mechanism for advancing the record chart comprises a supply drum 18, a driving drum 19 and a re-roll drum 20 carrying a record chart 21 in strip form.

The supply drum 18 and the re-roll drum 20 are fixedly mounted on shafts 22 and 23, respectively, which are removably journaled in suitable bearings secured to the side walls of the casing, such as U-shaped bearings 24, thereby permitting the ready removal or insertion of the drums.

The driving drum 19 is fixedly mounted on a shaft 25 suitably journaled in bearings 26 secured to the side walls of the casing. Preferably, the driving drum 19 carries sprockets 27, at one or both ends of the drum, cooperating with evenly spaced perforations 28 in the moving strip 21, in order that the position and ratio of motion of the strip may be accurately determined by the rotation of the driving drum.

A pulley 29 is fixedly mounted on the driving drum shaft 25 and drives, as by means of an endless coiled spring belt 30, a pulley 31 fixedly mounted on the re-roll drum shaft 23, thereby winding the strip 21 on the re-roll drum 20 after it has passed over the driving drum 19. The driving drum may be driven by any suitable clock mechanism. In the particular embodiment shown, the driving drum is driven by an electric clock 32, of the self-starting synchronous motor type, which is suitably mounted on the side wall of the casing 10, as by means of a bracket 33. The clock mechanism includes a gear 34 which engages and drives a gear 35 fixedly mounted on the driving drum shaft 25. The gear 34 is driven by the clock motor through a suitable clutch mechanism such as the spider 36 and gear 37.

One end of the driving drum shaft 25 projects beyond the side wall of the casing and has a knurled knob 38 keyed thereto. The knob provides means for setting the driving drum and strip at correct marks when inserting a new strip and for resetting the drum and strip as required. A tension spring 39 is suitably mounted on the rear wall of the casing 10 and is positioned to bear against the supply drum 18 to prevent the strip from unwinding therefrom except when unwound by action of the driving drum.

The record strip 21 may be of any suitable type adapted to receive markings made by a stylus carrying a pen or pencil, the preferred type is an indelible strip which only needs to have a pressure exerted by a stylus to form a mark thereon. The rate of rotation of the driving drum is determined by the reduction effect of the gears 35, 34 and 37, or other suitable reduction gear, if required. In the preferred embodiment, the rotation of the driving drum will be timed to allow the strip 21 to pass the point of engagement with the styli at the rate of six inches per hour.

In the particular embodiment shown, the mechanism for making recordings on the moving strip 21 includes a plurality of levers 40 pivotally mounted intermediate their ends on a shaft 41 fixedly mounted in upstanding brackets 42 formed on the bottom of the casing.

Each of the levers 40 has an upstanding arcuate member or shutter 43 formed on its forward end and an upwardly projecting lug 44 carrying a spring stylus 45 formed on its forward end, rearwardly of the shutter. In addition, each of the levers is provided with a pair of vertical openings 46, 47, preferably spaced equidistant from the center line of the shaft 41.

The levers are adapted to be individually swung upwardly or counterclockwise about the shaft 41 from a normal non-recording position, in which the tips of their styli are out of engagement with the record strip 21 and the tops of their shutters are positioned below the window openings 17, to a recording position in which the tips of their styli engage the record strip and make markings thereon as the record strip is moved and with their shutters positioned to be visible through the windows 17. Means are provided for actuating the levers.

In the particular embodiment shown, such actuating means comprise a plurality of Bowden wires 48, each of which has one end of its plunger 49 operatively connected to one of the levers 40 in such a manner as to swing the lever counterclockwise about its pivot by either a pushing or pulling movement.

Figure 7:
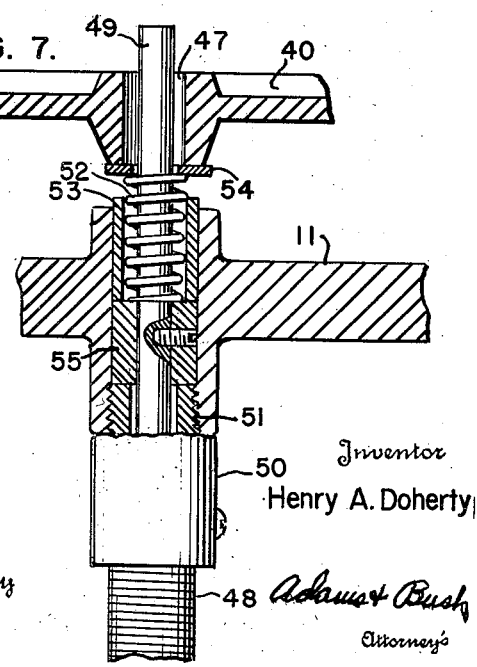
Fig. 7 is an enlarged fragmentary vertical sectional view showing the details of the mounting of the actuating member, as shown in Fig. 5.
Figure 5:
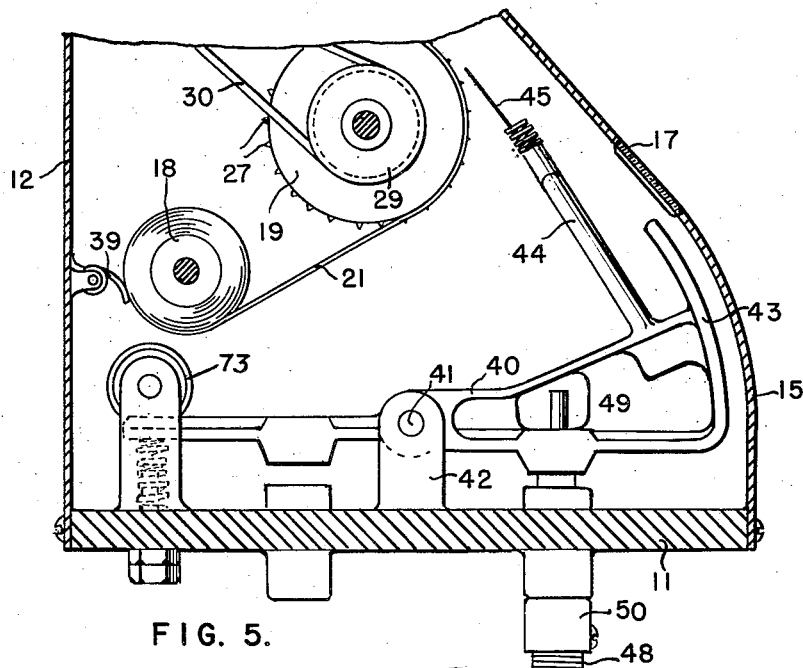
Fig. 5 is a fragmentary vertical sectional view, taken on line 5—5 of Fig. 3, showing a stylus carrying lever connected to be swung upwardly by a pushing movement.

The details of the manner in which a Bowden wire is connected to actuate a lever by a pushing movement are shown in Figs. 5 and 7. As there shown, one end of a Bowden wire 48 is secured to the bottom wall of the housing 10, by means of a coupling 50 screwed into a bore 51 formed in the bottom wall, with the end of the Bowden wire plunger 49 projecting upwardly through the bore and the opening 47 in the lever 40. A spring 52 encased in a collar 53 is loosely mounted on the plunger 49 within the bore 51 with the upper end of the spring engaging a washer 54 mounted on the plunger 49 below the lever 40. A second collar 55 is fixedly mounted on the plunger 49 for sliding movement therewith within the bore 51 and is positioned below and engages the spring 52 and collar 53.

When the plunger 49 is pushed upwardly, the collar 55 pushes the spring 52 and washer 54 upwardly against the underside of the lever 40, thereby swinging the right hand side of the lever upwardly and bringing the stylus mounted thereon into recording position. The diameter of the opening 47 in the lever 40 is sufficiently larger than the diameter of the plunger 49 to permit the lever to swing in an arc the short distance required to bring the stylus into operating position.

Figure 8:
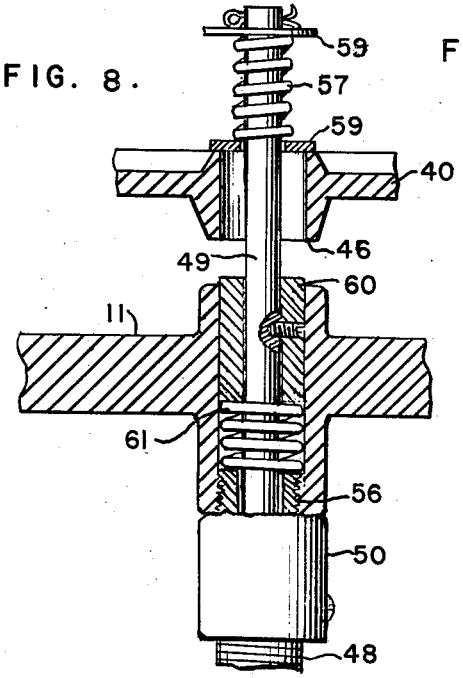
Fig. 8 is an enlarged fragmentary vertical sectional view showing the details of the mounting of the actuating members shown in Fig. 6.
Figure 6:
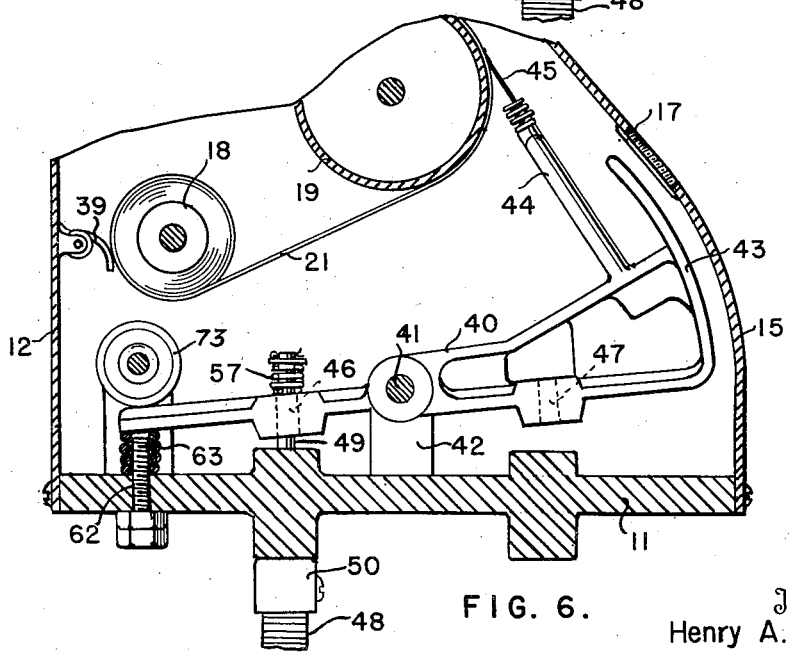
Fig. 6 is a fragmentary vertical sectional view, taken on the line 6—6 of Fig. 3, showing a stylus carrying lever connected to be swung upwardly by a pulling movement.

In Figs. 6 and 8, the Bowden wire 48 is shown as connected to actuate a lever 40 by pulling. As there shown, one end of the Bowden wire is secured to the bottom wall of the casing, as by means of a coupling 50 screwed into a bore 56 formed in the bottom wall, with the end of the plunger 49 projecting upwardly therethrough and through the opening 46 in the lever 40. A spring 57 is mounted on the projecting end of the plunger 49, above the lever 40, and is held in position thereon by suitable means such as a cotter pin and washers 58, 59. A collar 60 is fixedly mounted on the plunger 49 for sliding movement therewith within the bore 56 and a coiled spring 61 is loosely mounted on the plunger below the collar 60. When the plunger 49 is pulled downwardly, the lever 40 is rotated counterclockwise, bringing the stylus into recording position.

Suitable means are provided to cushion the movement of the levers 40, whether such movement is caused by a pushing or pulling movement of the Bowden wire plunger, as shown in Figs. 5 and 6. Such means comprises a plurality of adjustable stud bolts 62 threaded into and projecting upwardly from the bottom of the casing. Each of the bolts 62 is positioned below the rear end of a lever 40 and has a coil spring 63 mounted thereon with the lower end of the spring fixedly attached thereto. The upper ends of the springs engage the undersides of the levers 40. The springs 63 cooperate with the spring 52, as shown in Fig. 5, and with the springs 57 and 61, as shown in Fig. 6, to prevent any bouncing movement of the levers.

The recording device may be used with a group of machines of any type to record the down or idle time of the machines. In addition, it may be used on a single machine, equipped with one or more of the usual types of stop motion devices which operate to stop the machine in response to a particular function failure, to record the down or idle time caused by each particular function failure.

When used on a single machine, the casing 10 containing the recording mechanism is suitably mounted on the machine frame with the free end of each of the Bowden wires 48 suitably secured to the machine in such a manner as to be suitably engaged and operated by a movable part thereof, which part is moved by one of the stop motion devices when it operates to stop the machine in response to a particular function failure of the machine. The Bowden wires may be positioned to have their plungers 49 either pulled or pushed by the moving part of the machine, depending upon which type of connection is preferable in each case. By way of illustration, there is shown diagrammatically in Fig. 9, a Bowden wire 48 positioned to have its plunger 49 engaged by a lever 64 operatively associated with the machine and adapted to be moved to the right (as viewed in Fig. 9) by a stop motion device when it operates to stop the machine in response to a particular function failure of the machine.

In Fig. 10, a Bowden wire 48 is shown as positioned to have its plunger 49, which is provided with a lateral projection 65, engaged by a lever 66 operatively associated with the machine and adapted to be moved to the left (as viewed in Fig. 10) by a stop motion device when it operates to stop the machine in response to a particular function failure of the machine.

In actual operation, the number of Bowden wires employed correspond to the number of stop motion devices incorporated in the machine. In addition, it is contemplated that the right hand one of the levers 40, as viewed in Fig. 1, shall have its Bowden wire mounted on the machine in a position to be engaged and operated by the master control switch, lever or shipper handle of the machine. This would provide a continuous record of the total down or idle time of the machine.

In order to insure that a stylus carrying lever, which has been moved into recording position by a function failure of the machine, remains in such recording position throughout the period of stoppage due to the function failure, there has been provided a lever locking mechanism.

Figure 11:
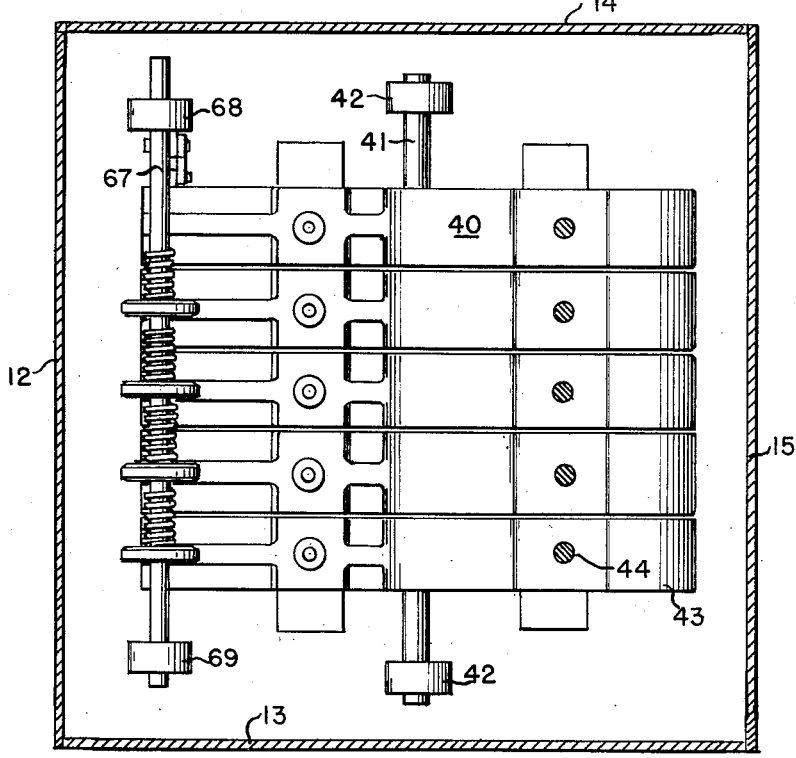
Fig. 11 is a plan view of the lever locking mechanism.
Figure 12:
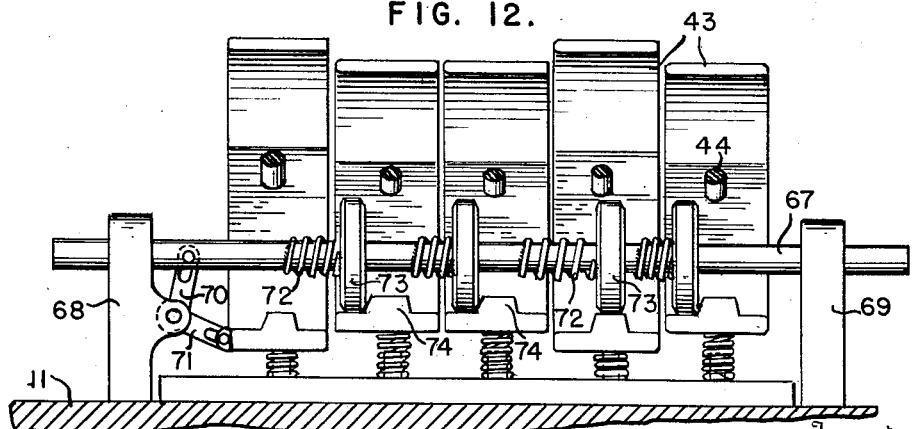
Fig. 12 is a rear elevational view of the mechanism shown in Fig. 11.

The details of the lever locking mechanism are shown in Figs. 11 and 12 and include a rod 67 slidably mounted in upstanding projections or lugs 68, 69 formed on the bottom wall of the casing. The rod 67 is positioned above and extends transversely of the rear ends of the levers 40. A bell crank lever is pivotally mounted on the lug 68 and has its upper arm 70 pivotally connected to the rod 67 and its lower arm 71 pivotally connected to the rear end of the outer right hand lever 40, as viewed in Fig. 1. Thus, when the outer right hand lever is rotated counterclockwise to bring the stylus thereon into recording position, the rod 67 will be moved to the right, as viewed in Fig. 12, and, when the lever is rotated to bring the stylus to non-recording position, the rod 67 will be moved to the left. A plurality of spring operated disc assemblies are mounted on the rod 67, one such assembly for each of the remaining levers 40. Each spring disc assembly comprises a coiled spring 72 having one end fixedly attached to the rod 67 and the other end fixedly attached to a disc 73 which is slidably mounted on the rod 67. Each of the levers 40 is provided with a raised longitudinally extending rib or abutment 74, for a purpose hereinafter to be described.

The spring disc assemblies are so positioned upon the rod 67 that, when the rod is in its extreme left or non-locking position, as viewed in Fig. 12, the springs 72 are extended and the discs 73 are positioned above the ends of the levers 40 and slightly to the left of the ribs or abutments 74, and, when, the rod 67 is in its extreme right or locking position, the discs 73 are pressed against the abutments 74 and the springs 72 are compressed. Obviously, when any of the levers 40 are moved to raise its stylus to recording position, the rear end of the lever on which the abutment is formed will be depressed, thereby permitting the compressed spring 72 to extend, pushing its attached disc 73 into a position on top of the abutment, thereby locking the lever in the recording position. This is shown in Fig. 12, where the fourth lever from the left has been locked in recording position.

The operation of the device is as follows:

Assume the recorder is mounted on a machine which has incorporated therein four stop motion devices, each of which will operate to stop the machine upon the failure of a particular machine function. The right hand or No. 1 stylus carrying lever will have its Bowden wire secured to the machine in such manner that the lever will be actuated when the master control switch or shipper handle is thrown to off position, thereby recording the stoppage or down time of the machine. Each of the four remaining stylus carrying levers will have its Bowden wires secured to the machine in such manner that it will be actuated by one of the stop motion devices when it operates to stop the machine upon the failure of a particular machine function, thereby recording the stoppage time due to the particular function failure. When a function failure occurs, the stop motion device operated thereby will actuate the stylus carrying lever operatively associated therewith as it stops the machine. When the stop motion device stops the machine by throwing the master control switch, lever or shipper handle to "off" position, the right hand stylus carrying lever will be actuated, thereby operating the locking mechanism to hold the stylus carrying lever actuated by the function failure in its actuated position until the machine is started up again. When a stylus carrying lever has been actuated to bring its stylus into engagement with the moving record strip, the visual indicator or shutter mounted on the lever will be visible through its corresponding window opening 17; hence, the machine operator will be immediately able to see which particular function failure caused the machine to stop. In addition, the machine operator may at any time observe the record chart through the large window opening 16.

Figure 13:
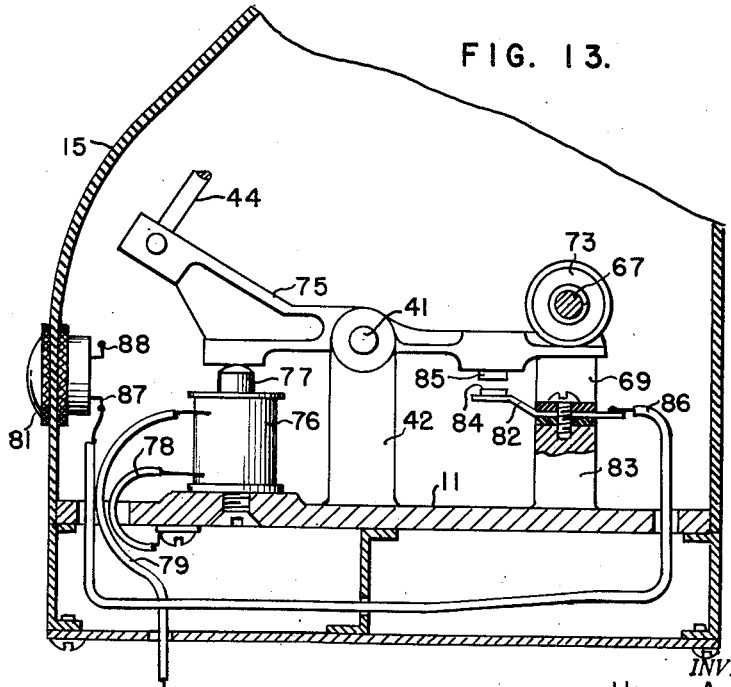
Fig. 13 is a fragmentary vertical sectional view showing a modified form of electrically operated stylus carrying lever and electrically operated visual indicating means.

In Fig. 13, there is shown a modification of the recording device. In this particular modification, the mechanism for moving the record strip and the mechanism for locking the stylus carrying levers are identical to that shown in Figs. 1 to 12 inclusive; however, electrical means are employed to actuate the stylus carrying levers and to give a visual indication of such actuation. In this modification, the stylus carrying levers 75 are similar in construction and mounting to those shown in Figs. 5 and 6, except that the shutters have been omitted. The levers 75 are actuated by means of a plurality of solenoids 76 suitably mounted on the bottom of the casing. Each solenoid is mounted below the forward end of a lever 75 with its plunger 77 positioned to engage the underside of the lever and move it upwardly when the solenoid is energized. In the particular embodiment shown, each solenoid is connected in a circuit grounded through the recording device and the machine. This circuit includes a ground connection 78 connecting one end of the solenoid winding to the base of the recording device and a connection 79 connecting the other end of the solenoid winding to a terminal of a microswitch 80 (shown diagrammatically in Fig. 14). The other terminal of the microswitch is connected to the line source of supply. The microswitches 80 suitably secured to the machine in such a manner as to be suitably engaged and closed by a moving part thereof, which part moves as a result of a particular function failure of the machine, in a manner similar to that illustrated in Fig. 9.

Visual indication of the actuation of the stylus-carrying levers 75 is accomplished by means of a plurality of lamps 81 mounted in the lower part of the front wall of the casing 10. Each lamp is connected in a circuit which is grounded through the recording device and the machine and is closed upon the movement of a lever 75 to recording position and opened upon the movement of the lever back to non-recording position. Each of these circuits includes a spring contact member 82 mounted on an upstanding lug 83 formed on the bottom of the casing. One end of the spring member 82 is provided with a contact point 84 positioned below and adapted to be engaged by a contact point 85 formed on the underside of the lever 75. The other end of the spring member 82 is connected, by means of an insulated conductor 86, to one terminal 87 of the lamp. The other lamp terminal 88 is connected to a source of electric supply (not shown).

Figure 14:
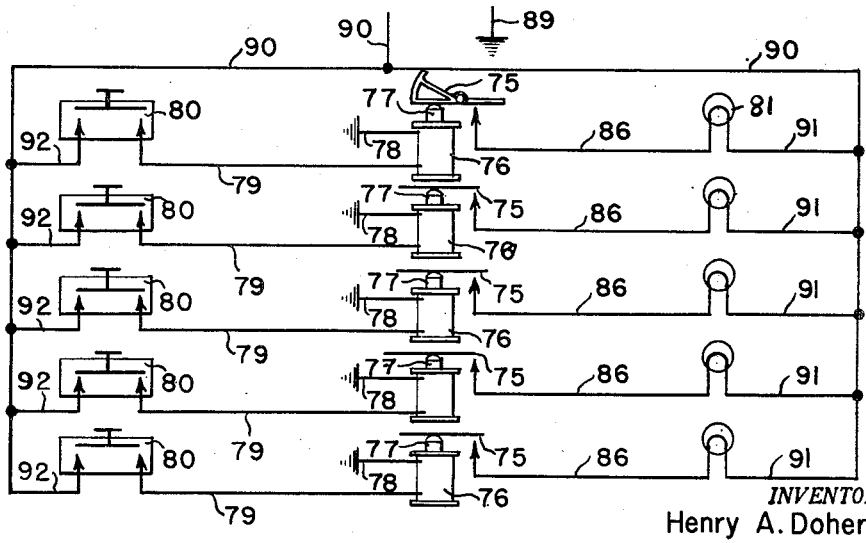
Fig. 14 is a diagrammatic view illustrating the wiring and some of the construction of the modification shown in Fig. 13.

In Fig. 14, there is shown a wiring diagram of the apparatus and some of the mechanical construction. As there shown, one wire 89 of the line from the electrical source of supply is grounded to the recording device and the other wire 90 is connected directly to the lamps 81 by means of connections 91 and to one of the terminals of the microswitches 80 by means of connections 92. The other of the terminals of the microswitches 80 are connected, by means of connections 79, to the solenoids 69. The solenoids are grounded to the recording device by means of connectors 78.

Figure 15:
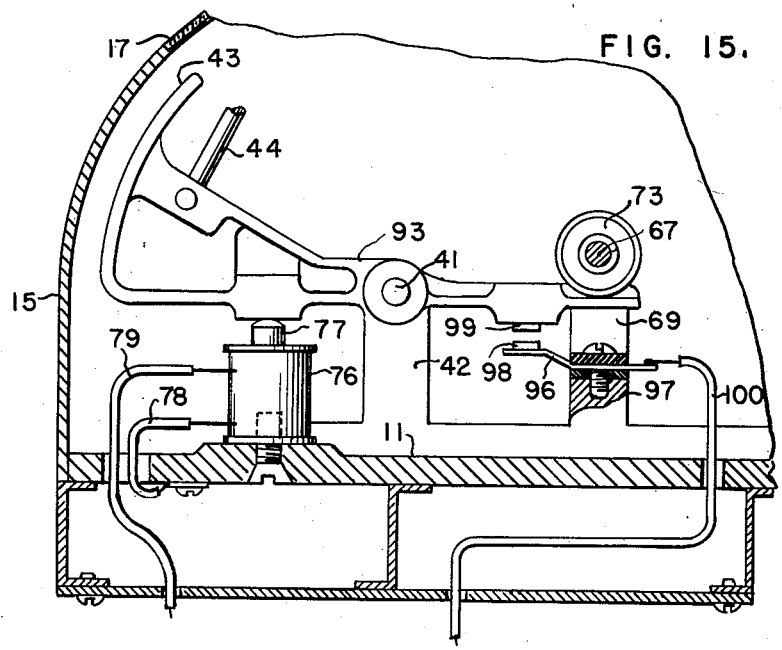
Fig. 15 is a fragmentary vertical sectional view showing an electrically operated stylus lever, having visual indicating shutters and having electrical switches for controlling a remote visual indicating station.
Figure 16:
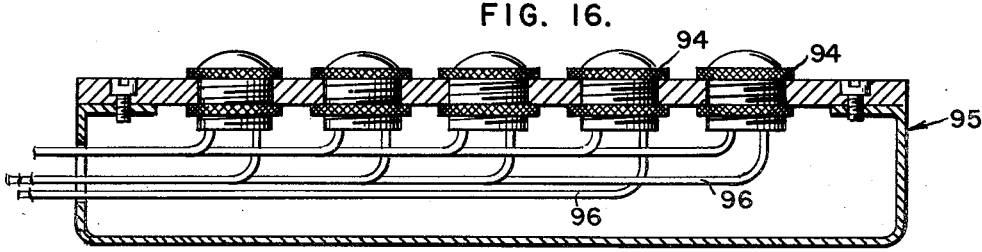
Fig. 16 is a vertical sectional view of a remote visual indicating station.
Figure 17:
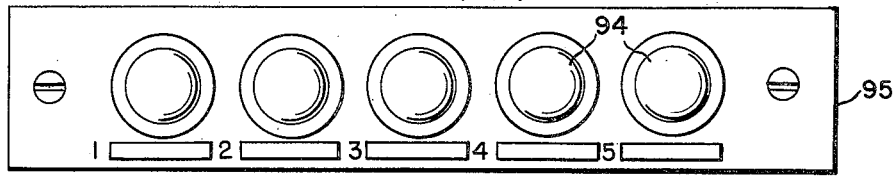
Fig. 17 is a plan view of the device shown in Fig. 16.

In addition to the window openings and shutters, as shown in Figs. 5 and 6, or the lamps, as shown in Fig. 13, for visually indicating the stoppage of the machine and showing which function failure caused the stoppage, it is contemplated, as a part of this invention, to provide visual indicating devices which may be located at a place remote from the recording device, as for instance, in the foreman's or plant superintendent's office. Such an arrangement is shown in Figs. 15 to 18 inclusive. In the modification there shown, the stylus carrying levers 93 are similar in construction and mounting to those shown in Figs. 5 and 6, and are similarly provided with shutters which are visible through the openings 17 in the casing 10 when the levers are moved to bring the styli into recording position. The levers 93 are operated by means of solenoids and microswitches which are similar in construction and arrangement to those shown in Figs. 13 and 14. In this particular modification, a plurality of lamps 94 (corresponding to the lamps 81 shown in Fig. 13) are mounted in a housing 95 located in a position remote from the recording device. Each of the lamps 94 is connected in a circuit which is grounded through the recording device and the machine and which is closed upon the movement of a lever 93 to recording position and opened upon the movement of the lever back to non-recording position. Each of these circuits includes a spring contact member 96 mounted on an upstanding lug 97 formed on the bottom of the casing. One end of the spring member 96 is provided with a contact point 98 positioned below and adapted to be engaged by a contact point 99 formed on the underside of the lever 93. The other end of the spring member 96 is connected by means of an insulated conductor 100, to one terminal of the lamp. The other lamp terminal is connected to a source of electrical supply (not shown). The wiring of the modification shown in Figs. 15, 16 and 17 is similar to that shown in Fig. 14.

When solenoids and plungers are used to actuate the stylus carrying levers, as illustrated in the modifications shown in Figs. 13 and 15, the lever locking mechanism functions in the same manner as shown and described in connection with the use of Bowden wires to actuate the levers. In which case, the extreme right hand lever, as seen from the front of the machine, would have the microswitch which controls its movement, connected to be operated by the master control switch or shipper handle of the machine.

Figure 18:
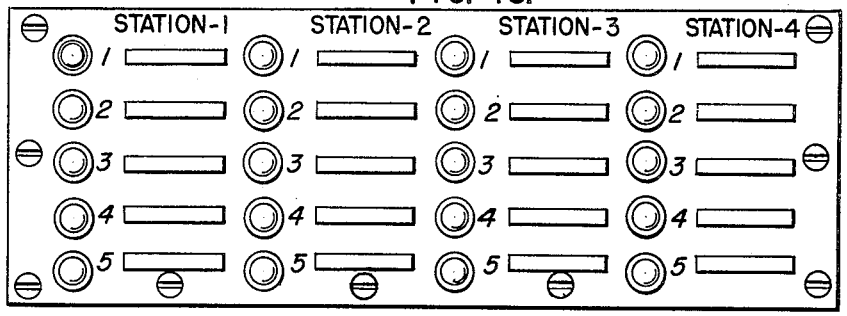
Fig. 18 is a plan view of a master board on which a plurality of remote visual indicating stations are mounted.

It is further contemplated that, when recording devices are mounted on a plurality of machines, visual indicating lamps for each recording device be mounted on a board such as shown in Fig. 18, which may be located in the foreman's or plant superintendent's office.

From the foregoing, it will be seen that there has been provided a recording device which may be electrically or mechanically actuated to record the idle time of any of a plurality of machines or the idle time of a single machine caused by particular function failures thereof. In addition, the device will indicate at the machine or in a remote location, which machine has stopped, or, in the case of a single machine, what particular function failure caused the machine to stop.

Obviously, the invention is not restricted to the particular embodiments thereof herein shown and described. Moreover, it is not indispensable that all the features of the invention be used conjointly, since they may be employed advantageously in various combinations and sub-combinations.

What is claimed is:

1. Apparatus of the character described for use with a machine equipped with a plurality of stop motion devices each of which operates to stop the machine upon the failure of a particular machine function, comprising in combination, time controlled means to give a record sheet a continuous movement; a plurality of marker members, each movable from a normal inoperative position in which the marker is out of engagement with said record sheet to an operative position in which the marker engages the record sheet and leaves continuous marks thereon as the sheet moves; a plurality of actuating devices, each adapted to be operated by one of the stop motion devices and operatively connected to one of the marker members for moving it from its inoperative position to its operative position, each of said actuating devices including an operating member adapted to be mounted on the machine in position to be operatively engaged by one of the stop motion devices as it operates to stop the machine; and locking means for holding any of the actuated marker members in their operative position, said locking means including a plurality of spring urged locking elements, one for each of said marker members, and means normally holding said locking elements in an operative position out of engagement with said marker members and movable upon each stoppage of the machine to bring said locking elements to an operative position in which the locking elements engage their respective marker members and hold any actuated one or ones thereof in their operative position during the period of machine stoppage, whereby the record strip will show successive machine stoppages, the duration thereof, and the particular function failure which caused each stoppage.

2. Apparatus as set forth in claim 1, wherein said locking means includes a movable member on which said spring urged locking elements are movably mounted, said movable member being movable from a normal inoperative position in which the locking elements are out of engagement with said marker members to an operative position in which the locking elements engage said marker members and hold any actuated one or ones thereof in their operative position, and an actuating device adapted to be operated upon each stoppage of the machine operatively connected to said movable member for moving it from its inoperative to its operative position.

3. Apparatus as set forth in claim 1, wherein said marker members comprise pivoted levers each having a stylus mounted on one end and an abutment formed on the other end, and wherein said locking means includes a movable rod on which said spring urged locking elements are movably mounted, a bell-crank lever operatively connected to move said rod to bring said locking elements into engagement with said abutments upon the stopping of the machine; and means to operate the bell-crank lever in response to the machine stoppage.

4. Apparatus as set forth in claim 1, wherein said marker members comprise pivoted levers mounted on a common shaft, each having a stylus mounted on one end and an abutment formed on the other end, and wherein said locking means includes a reciprocable rod on which said spring urged locking elements are movably mounted, a bell-crank lever operatively connected to move said rod to bring said locking elements into engagement with said abutments upon the stoppage of the machine, a separate lever pivotally mounted on said common shaft and connected to the bell crank lever, and a longitudinally movable element adapted to be operated in response to the stoppage of the machine to actuate said separate lever.

5. In an apparatus for recording and/or indicating data relative to the operation of a machine equipped with stop motion devices, the combination with a plurality of members each normally held in an inoperative position and movable upon the operation of a stop motion device to an operative position to cause a record and/or indication to be made of the stoppage of the machine, of a locking mechanism operable upon each stoppage of the machine to coact with said members and hold any actuated one thereof in its operative position during the period of machine stoppage, whereby separate and continuous records and/or indication will be made of each machine stoppage, said locking mechanism including a plurality of spring urged locking elements; a reciprocatable member on which said spring urged locking elements are movably mounted, said reciprocatable member being movable from a normal inoperative position in which the locking elements are out of engagement with said movable members to an operative position in which the locking elements engage said movable members and hold any actuated one or ones thereof in their operative position, and an actuating device adapted to be operated upon each stoppage of the machine operatively connected to said reciprocatable member for moving it from its inoperative position to its operative position.

HENRY A. DOHERTY.

REFERENCES CITED

The following references are of record in the file of this patent:

UNITED STATES PATENTS

| Number | Name | Date |
|---|---|---|
| 518,534 | Olan | Apr. 17, 1894 |
| 871,434 | Oakes et al. | Nov. 19, 1907 |
| 1,013,389 | Hickton | Jan. 2, 1912 |
| 1,066,744 | McIntosh | July 8, 1913 |
| 1,139,251 | Bell | May 11, 1915 |
| 1,154,983 | Ford | Sept. 28, 1915 |
| 1,309,235 | Avram | July 8, 1919 |
| 1,402,789 | Ohmer | Jan. 10, 1922 |
| 2,291,475 | Kellogg | July 28, 1942 |
| 2,344,497 | Cooney | Mar. 29, 1944 |